June 17, 1969
R. E. HULTEN
3,449,980
TRANSMISSION SHIFT CONTROL
Filed Dec. 11, 1967
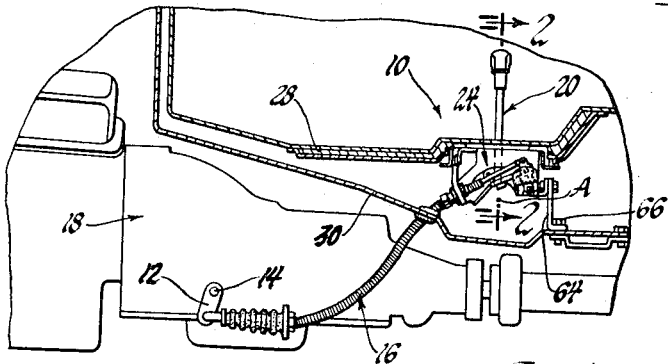
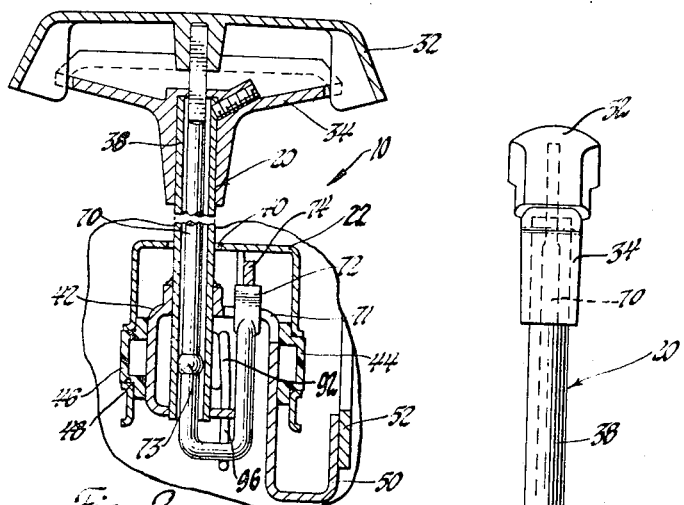
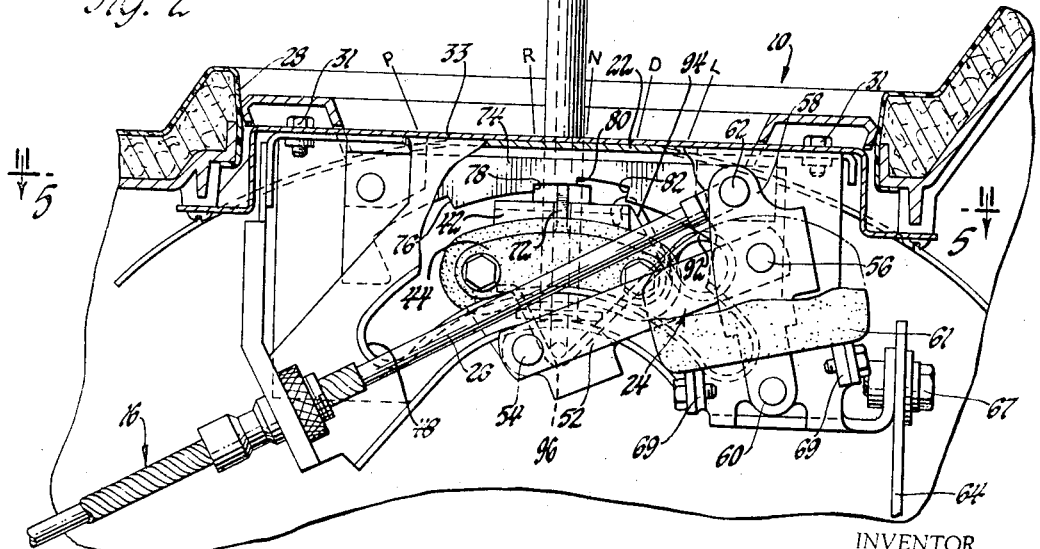
INVENTOR.
Richard E. Hulten
BY
Charles R. White
ATTORNEY United States Patent Office 3,449,980
Patented June 17, 1969

3,449,980
TRANSMISSION SHIFT CONTROL
Richard E. Hulten, Rochester, Mich., assignor to General Motors Corporation, Detroit, Mich., a corporation of Delaware
Filed Dec. 11, 1967, Ser. No. 689,705
Int. Cl. G05g 9/00, 1/04, 5/06
U.S. Cl. 74—473
5 Claims

ABSTRACT OF THE DISCLOSURE

Remote controls for a transmission incorporating a shift lever assembly mounted for limited rotation by slide members disposed in arcuate slots in a housing assembly. The slots provide a remote pivot axis for the lever assembly permitting the use of a short shifter lever having a long effective length. The lever assembly actuates a cable which turns the transmission shifter shaft to condition the transmission for neutral, park or a selected drive range. The shift lever assembly includes a spring biased detent portion which engages stop shoulders to inhibit inadvertent movement of the lever assembly from predetermined positions.

---

This invention relates to transmission shift controls and more particularly to a transmission shifter assembly having a slide assembly mounting the shift lever for limited rotation about a remote pivot axis.

In many modern vehicles the transmission control lever is mounted on the vehicle floor adjacent to the vehicle operator for efficient and convenient vehicle operation. This control lever is usually supported by a pivot to a bracket secured to the vehicle floor and when manipulated by the vehicle operator, the lever actuates a linkage or cable construction which is connected to a transmission shifter shaft extending outwardly from the transmission case. Turning of this latter shaft to predetermined positions conditions the transmission for predetermined drive ranges, park or neutral.

To provide for adequate cable and linkage movement, a lever of appreciable effective length is needed. Such levers take up space within the vehicle compartment for driver and passengers and these levers and their pivot mountings add weight to the assembly and to the vehicle. Furthermore, they are not easily mounted to the floor of the vehicle in the area of the tunnel provided for the transmission and propeller shaft.

This invention encompasses an improved shifter assembly including a shift lever in which spaced slider members are mounted in curved grooves in a housing assembly which locate the pivot for the shift lever remote from the shift lever assembly to permit the lever to have an effective longer length. The spaced slides provide improved stabilized support for the shifter assembly; and since bearing loads will be taken by two elements instead of one, lighter construction is provided by this invention. Furthermore with this invention, an improved detent is provided to inhibit the inadvertent moving of the shift lever from forward drive to reverse drive, from reverse drive to park, from park to reverse or forward drive, or from a high speed forward drive to lower speed forward drive. By depressing an outer handle of the shift lever the detent is moved to a non-blocking position and permits normal operation of the shift lever assembly.

This invention also provides a compact shifter assembly package which is readily adaptable to fit most modern vehicles where a remote pivot is needed such as in vehicles having a high tunnel and low console. The cable connecting the lever to the transmission is moved longitudinally away from the transmission to provide for better cable routing.

These and other objects, features and provisions of the invention will become more apparent from the following detailed description and drawings in which FIGURE 1 is a longitudinal view partly in section of a portion of a vehicle.

FIGURE 2 is a cross-sectional view taken generally along the lines 2—2 of FIG. 1.

FIGURE 3 is an enlarged view of a portion of FIG. 1.

Figure 4:
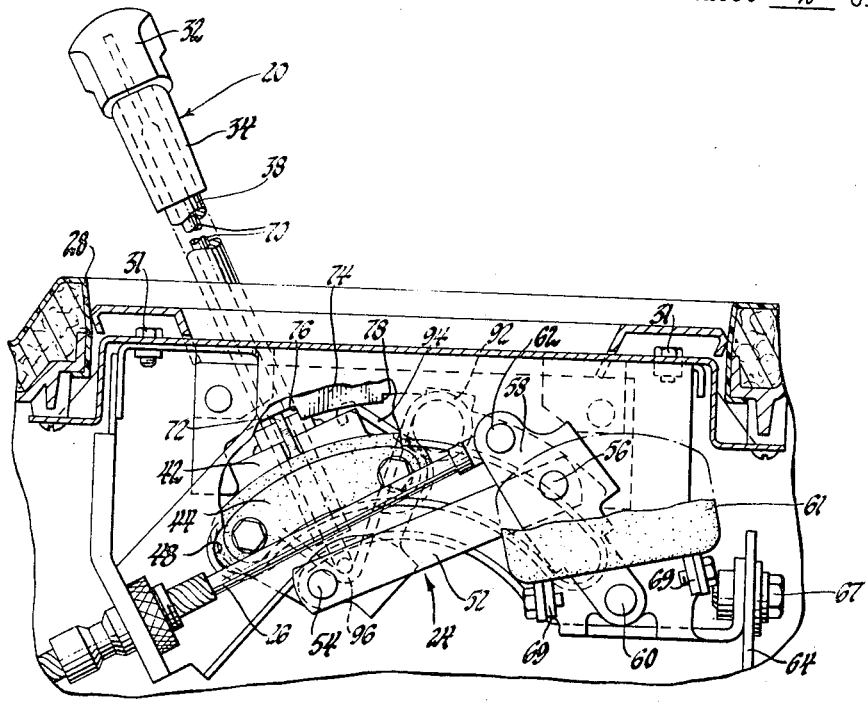
FIGURE 4 is a view similar to FIG. 3 showing parts moved to a different position.

Referring to the drawings in detail and particularly FIGURE 1, there is a transmission control generally indicated at 10 for turning a control lever 12 and a connected shifter shaft 14 through a cable assembly 16. The shifter shaft extends into the case of the automatic transmission 18 and is connected to a selector valve, not shown, positionable by the turning shaft to condition the transmission for park, neutral or any selected drive range.

The transmission control includes a lever assembly 20 mounted for limited rotation in a housing assembly 22, and a linkage assembly 24 for connecting the lever assembly to cable 26 of the cable assembly. The housing assembly and linkage assembly is supported within a shift console 28 mounted on the humped portion of the vehicle floor 30 which forms the tunnel for the transmission and propeller shaft. Bolts 31 secure the housing assembly to the top plate 33 of the console.

As shown in FIGURE 2, the lever assembly includes a shift lever having outer and inner handles 32 and 34 with the inner handle fixed by a screw to a tubular lever shaft 38. This shaft extends from the operator and passenger compartment through an elongated opening formed in the top plate of the console and through a longitudinal slot 40 in the housing assembly and through aligned openings in a carrier 42 located within the confines of the housing assembly. Shaft 38 is welded or otherwise fixed to the carrier. The carrier has spaced sides to which are attached identical arcuate-shaped slides 44 and 46 made of nylon, Teflon or other suitable materials having high-wear characteristics and having low coefficients of friction with the material of the housing assembly. The slides are generally U-shaped in cross section, each having a projection which extends outwardly into adjacent, elongated, arcuate slots or tracks 48 formed in the opposing side walls of the housing and having the same radius of curvature as the projecting portion of the slides. As shown by FIGS. 3 and 4, the arcs of the slots are substantially greater than the arcs of the slides to permit the lever assembly to be turned to the limits permitted by contact of the ends of the slots 48 with the ends of the projecting portions of the slides 44 and 46. The axis of rotation of the lever assembly is determined by the curvature of the slots and is in the embodiment illustrated at point A above the tunnel; however, this pivot point may be inside the tunnel.

Figure 5:
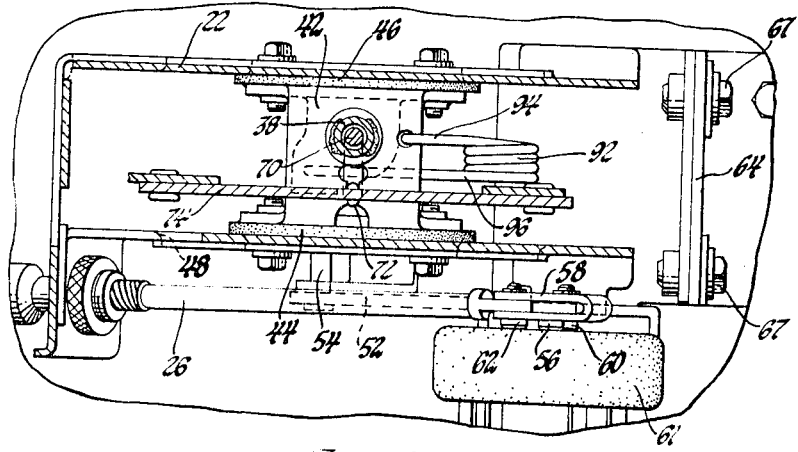
FIGURE 5 is a view taken along lines 5—5 of FIG. 3.

As shown in FIGS. 2 and 3, one side of the carrier is formed with an extension 50 having an upwardly extending portion to which a link 52 is pivoted by pivot pin 54. Link 52 extends longitudinally in the console and has its far end connected by a pivot pin 56 to a lever 58 that is pivoted to the housing assembly by pivot 60. The cable 26 is connected by a pivot pin 62 to the upper or free end of the lever 58. A bracket 64 secured to the floor by bolts 66 supports the housing assembly as shown in FIGS. 3, 4 and 5. Bolts 67 secure the housing assembly to the bracket. A switch 61 operated by lever 58 is also supported by adjustable mountings 69 on one side of the housing assembly. This switch is closed when the lever 58 is in neutral or park position to permit the vehicle engine to be started through the ignition switch.

With the construction described, movement of the lever assembly 20 moves the carrier in an arcuate path with respect to the remote pivot. The turning force applied to the carrier is transmitted by the link 52 to the lever 58. When the lever 58 is turned clockwise or counterclockwise, the cable 26 is correspondingly pulled or pushed to rotate the lever 12 and shifter shaft 14 to condition the transmission for neutral, park or a selected drive range.

With the lever mounted for limited rotation about the remote pivot axis such as at point A, the lever can be made as short as desired and, accordingly, can be designed to require little room in the vehicle compartment. Since longer levers are not required, weight is reduced and this weight reduction is further enhanced by the improved slide construction described above. This invention is particularly useful when there is a high tunnel and low console and where a long lever is undesirable.

The outer handle 32 is secured to an inner rod 70 that extends completely through the tubular shaft 38. The lower portion of this rod extends laterally beneath the bottom of the carrier and then projects upwardly through a slot 71 formed in the carrier. As shown in FIG. 2, the end portion of rod 70 terminates in a flattened detent 72. A bearing 73 provides a slidable fit between the rod and the tubular shaft to prevent rattle between these two parts. The detent 72 extends to the notched interior surface of the cam plate 74 and is engageable with the spaced radial shoulders 76, 78, 80 and 82 provided by the notches. These radial shoulders prevent the lever from being inadvertently moved from drive to low, from neutral to reverse or from reverse to park. As shown, the rod is biased upwardly by a coil spring 92 having an upper spring arm 94 fastened to the top of the housing assembly as shown in FIGS. 3 and 5 and a lower spring arm 96 which extends beneath the laterally extending portion of the rod as best shown by FIGS. 2, 3 and 4. This latter spring arm exerts an upward force on the rod to push rod 70 upwardly so that the detent 72 will ride on the interior surfaces formed in the detent plate.

If the lever is in the reverse drive position shown in FIG. 3 and it is desired to condition the transmission for park, the outer handle is manually depressed to move the detent 72 downwardly to a position where it will clear the shoulder 78. The lever assembly is then pushed forwardly to the FIG. 4 position to turn the carrier and the lever 58 counterclockwise to push the cable 26 and turn the lever 12 and shifter shaft 14 and thereby condition the transmission for park. Since the outer handle is released once the transmission is in park, the detent will be forced outward again to engage the cam plate. Contact of the detent and shoulder 76 will prevent inadvertent movement of the shifter lever from this park position. When the transmission lever is in either neutral or drive position, the shoulder 80 will prevent inadvertent movement of the lever to reverse; and shoulder 82 will prevent inadvertent movement of the lever to low range operation.

Although a particular embodiment of this invention has been shown and described, it will be appreciated that the invention is not to be restricted to such construction.

I claim:

1. In a transmission control, a transmission selector member, a support member for said selector member, one of said members having a curved track, track engaging means secured to the other of said members for contacting said track, said track and track engaging means providing pivot mounting means for mounting said selector member on said support member for limited rotation with respect to an axis remote from said transmission selector member.

2. In a transmission shift control, a selector lever member providing a remote control for a transmission, a support member for said lever member, one of said members having curved track means with a radius extending from a point below said support member and said lever member, the other of said members having track engaging means fixed thereto and contacting said track means to movably connect said lever member to said support member for movement with respect to said support member and for turning movement with respect to said point.

3. In combination, a transmission, a remote control selector member operatively connected to said transmission, a support for said control member, a curved slot in said support having an origin below said control member and said support, slide means mounted on said control member and projecting into said curved slot for mounting said control member for turning movement about said origin, detent means operatively connected to said control member, cooperating stop means engageable by said detent means for limiting the amount of turning movement of said control member, and release means supported by said control member operable to release said detent means from said stop means to permit said control member to be turned past said stop means.

4. In a control for a transmission providing a plurality of drive ranges, a selector movable to predetermined positions to condition the transmission for any selected drive range, a support for said selector having arcuate track means, said track means having an origin below said actuator and said support, slide means secured to said selector and engaging said track means for mounting said selector for limited turning movement about said origin, a detent carried by said selector, stop means counted in said support and engageable by said detent means for limiting turning movement of said selector, and release means supported by said selector and extending from said detent means operable to disengage said detent means from said stop means and thereby permit said selector to be turned to positions beyond said stop means.

5. The transmission control of claim 4 wherein said selector is a transmission shift lever assembly including a carrier secured to one end of said assembly, said support being a housing assembly having opposing sides and said track means being opposing curved slots in said sides, said slide means being formed with curved slides projecting from opposite sides of said carrier and into each respective slot, linkage means for connecting the transmission with said carrier, said linkage means including a link member pivotally connected to said carrier and a lever member pivotally connected to said housing assembly, pivot means connected to said link member to said lever member, cable means connecting said lever to said transmission, said detent means including a rod slidably mounted in said lever assembly having a detent formed on one end thereof, said stop means being a cam plate supported in said housing assembly having a plurality of spaced stop shoulders engageable by said detent to limit rotation of said shift lever assembly to predetermined drive range positions, spring means for biasing said rod member upwardly and said detent into engagement with said cam plate and into alignment with said stop shoulders, and said release means including a manually operable member secured to the other end of said rod member movable to displace said rod and detent to permit said shift lever assembly to be moved to the latter mentioned drive range positions.

References Cited

UNITED STATES PATENTS 1,631,066   5/1927   Saget _____ 74—535
2,884,802   5/1959   Loofbourrow _____ 74—473

MILTON KAUFMAN, Primary Examiner.

U.S. Cl. X.R.

74—523, 535